United States Patent
Fackler et al.

[15] 3,658,362
[45] Apr. 25, 1972

[54] FARM IMPLEMENT LEVELING MECHANISM

[72] Inventors: Kenneth C. Fackler, Anchor, Ill. 61720; John O. Bradford, 221 West 18th St., Gibson City, Ill. 60936; Elmo R. Meiners, Anchor, Ill. 61720

[22] Filed: Mar. 5, 1970

[21] Appl. No.: 16,812

[52] U.S. Cl................280/414.5, 172/328, 280/43.23
[51] Int. Cl...........................................B62d 61/12
[58] Field of Search..............280/414.5, 43.23; 172/328

[56] References Cited

UNITED STATES PATENTS

| | | | |
|---|---|---|---|
| 2,780,475 | 2/1957 | Koerner | 280/414.5 |
| 2,767,538 | 10/1956 | Scheidenhelm | 280/43.23 |
| 3,325,184 | 6/1967 | Dunker | 280/414.5 |
| 2,840,971 | 7/1958 | Greeson | 172/328 |

*Primary Examiner*—Leo Friaglia
*Attorney*—Molinare, Allegretti, Newitt & Witcoff

[57] ABSTRACT

Elevation and level control means is provided for a two-wheel farm wagon attached to a tractor by a draw bar. The draw bar is pivotally attached to the platform and is connected by a linkage member to a lever arm welded to a pivot rod journaled in the platform. Wheel mounting members are attached to the opposite ends of the pivot rod. An expansible cylinder is connected to still another lever arm welded to the pivot rod. By controlling the expansion of the cylinder, the pivot rod is rotated to thereby rotate the wheel mounting members and raise or lower the platform. Simultaneously, the draw bar is pivoted about its connection to the platform so that the hitch end of the draw bar attached to the tractor is maintained at a substantially constant level.

3 Claims, 3 Drawing Figures

PATENTED APR 25 1972

3,658,362

INVENTORS
ELMO R. MEINERS
JOHN O. BRADFORD
BY & KENNETH C. FACKLER
Molinare, Allegretti, Newitt &
Witcoff     ATTORNEYS

_3,658,362_

FARM IMPLEMENT LEVELING MECHANISM

BACKGROUND OF THE INVENTION

In a principal aspect, the present invention relates to the improvement in a vehicle of platform elevation and level control means.

It is not uncommon in a farming operation to provide an arrangement of tool bars comprising a platform of a vehicle. Various farm tools may be attached to the tool bars for plowing, cultivation or the like. When the tools are not being used but are merely being transported to a field site prior to use or subsequent to use, it is necessary to have an arrangement whereby the vehicle platform and attached tools are elevated above the ground level. Moreover, during the particular farming operation which is to be performed, it is desirable to control the depth of penetration of the particular farm tools into the soil. To accomplish these objectives, vehicles for mounting the farm tools normally include wheels which may be adjusted to control the elevation of the vehicle platform above the soil surface.

The elevation control arrangement for such a vehicle should therefore be easily adjustable to achieve any desired elevation. It should provide accurate and consistent control of the attitude of the vehicle with respect to the soil surface. For example, a number of cultivator blades may be attached to successive tool bars of the vehicle situated one behind the other. Regardless of the depth of cultivation, it is desirable to maintain the front cultivators and the rear cultivators at the same soil depth. Thus, the attitude or angle which the platform or the vehicle makes with the soil surface is desirably kept constant regardless of the relative elevation of the platform above the soil surface.

SUMMARY OF THE INVENTION

In a principal aspect, the present invention comprises the improvement in a vehicle having a platform, at least one wheel and a draw bar of elevation and level control means. The elevation and level control means are comprised of a wheel mounting member and first lever arm attached to a single first pivot axis on the platform with means to drive and rotate the mounting member and first lever arm about the axis. The first lever arm is linked to the draw bar which is pivotally attached to the platform. By rotation of the first lever arm and wheel mounting member about the first pivot axis, the platform elevation is altered while its attitude is maintained.

It is thus an object of the present invention to provide efficient and economical elevation and level control means for a wheeled vehicle.

It is a further object of the present invention to provide a leveling apparatus which maintains the vehicle at a constant attitude or angle relative to the surface of the ground regardless of the controlled elevation of the vehicle above the ground.

Still another object of the present invention is to provide a vehicle having a draw bar for attachment to a pulling vehicle, which draw bar maintains its hitch end at a substantially constant height regardless of the controlled elevation of the vehicle above the ground surface.

One further object of the present invention is to provide elevation and level control means for a vehicle which is structurally simple, yet sound.

These and other objects, advantages and features of the present invention will be set forth in greater detail in the description which follows:

BRIEF DESCRIPTION OF THE DRAWING

In the detailed description which follows, reference will be made to the drawing comprised of the following figures.

DESCRIPTION OF THE PREFERRED EMBODIMENT

Figure 1:
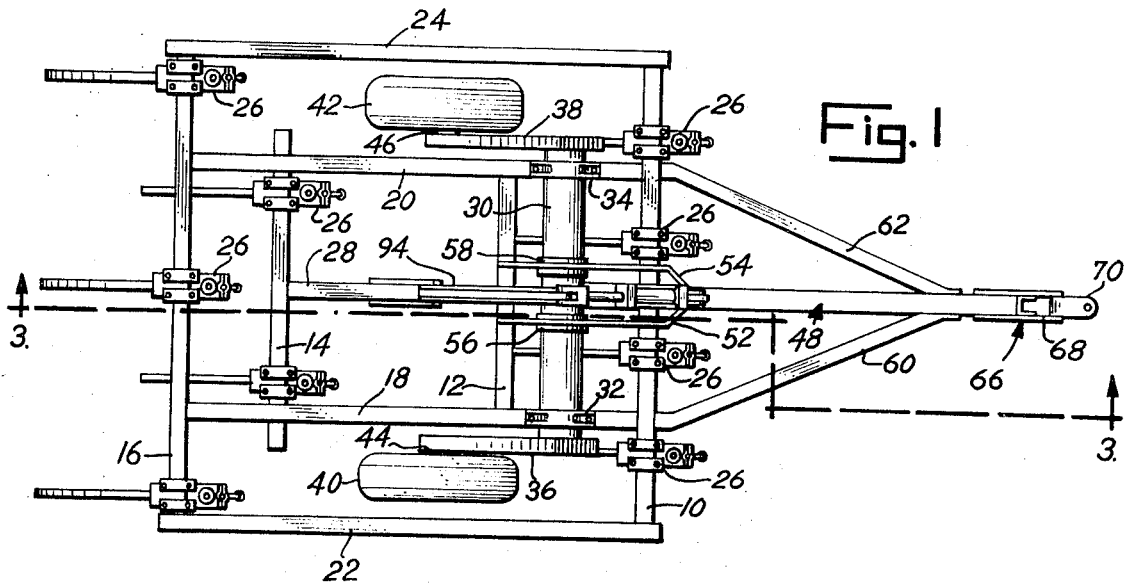
FIG. 1 is a top plan view of a typical vehicle incorporating the improvement of the present invention.
Figure 2:
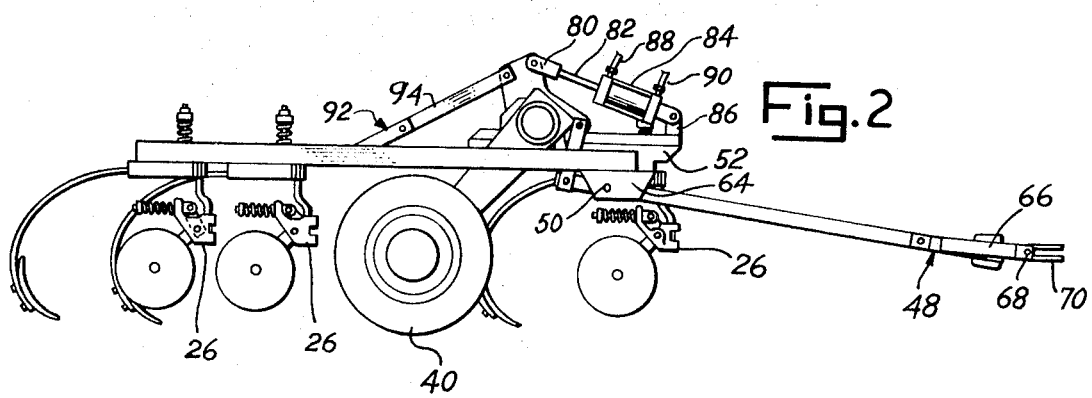
FIG. 2 is a side elevation of the vehicle shown in FIG. 1.

The FIGURES illustrate the incorporation of the improvement of the present invention in a two-wheel vehicle. The vehicle is especially constructed for the purpose of attachment of various farm tools to the tool bars incorporated as a part of the platform of the vehicle. Thus, the following description relates particularly to the illustrated farm vehicle. However, the invention is not limited to farm vehicles, nor indeed, two-wheel vehicles. For example, in the following description, the term "platform" is described as a grid of bars and members. This term is not, however, limited to the described structure and should be construed broadly to include any type of bed or other structure mounted on wheels. Also, the term "wheels" should be interpreted broadly to include wheels, runners, etc.

The platform of the illustrated farm vehicle includes four tool bars 10, 12, 14 and 16 which are parallel to each other and run transverse to the direction of intended vehicle travel. The tool bars 10, 12, 14 and 16 are structurally interconnected with each other by platform frame members 18 and 20. Outside platform frame members 22 and 24 structurally interconnect tool bars 10 and 12. Tool bars 12 and 14 are further structurally interconnected by the middle platform frame member 28. For purposes of illustration of the utility of the tool bars, a combination chisel plow and colter farm tool 26 is shown attached in a typical configuration to the tool bars 10, 14 and 16.

A wheel pivot rod 30 defining a first pivot axis substantially perpendicular to the direction of vehicle travel is journaled in bearings 32 and 34 attached to the platform frame members 18 and 20, respectively. Wheel mounting members 36 and 38 are welded to the outside ends of the pivot rod 30. The wheel mounting members 36 and 38 thus act as lever arms about the axis defined by the rod 30. Wheels 40 and 42 are attached to axles 44 and 46, respectively, at the outside ends of the mounting members 36 and 38, respectively.

Figure 3:
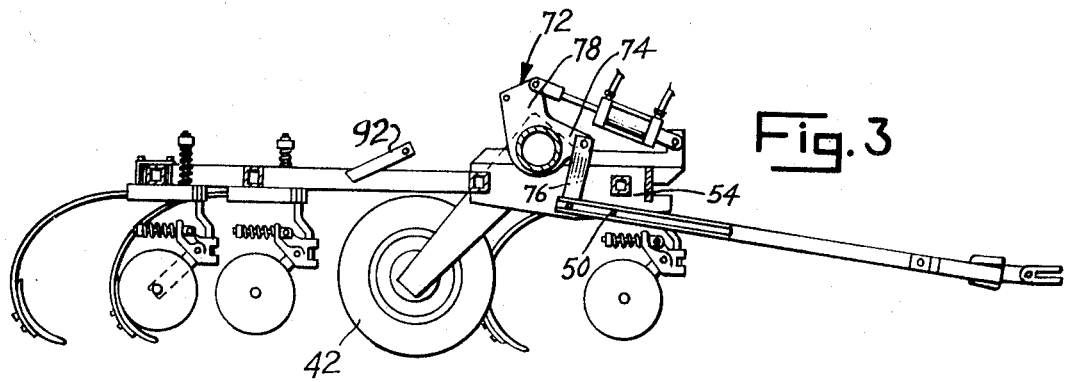
FIG. 3 is a side cross-sectional view of the vehicle shown in FIG. 1 taken substantially along the line 3—3 in FIG. 1.

Referring now particularly to FIGS. 1 and 3, a draw bar 48 is pivotally attached to the platform by means of a rod 50. Rod 50 extends between a pair of draw bar support plates 52 and 54 and defines a second pivot axis substantially parallel to the first pivot axis defined by the pivot rod 30. The plates 52 and 54 are welded to the tool bars 10 and 12 and include additional bearings 56 and 58 for the pivot rod 30. First and second draw bar support dogs 60 and 62 are connected from draw bar 48 to hinge assemblies. For example, a hinge assembly 64 for the dog 60 is attached to tool bar 10.

The hitch end 66 of the draw bar 48 includes a pivot connection 68 which enables a bifurcated hitch tongue 70 to be attached to a rigid hitch bar on a tractor. This permits the hitch end 66 of the draw bar 48 to pivot about a horizontal axis.

A central lever plate 72 is welded to the rod 30 to rotate coincidently therewith. A first lever arm extension 74 of the plate 72 is pivotally connected at its outer end by a linkage arm 76 to the inner end of the draw bar 48. The plate 72 also includes a second lever arm extension 78. The second lever arm extension 78 pivotally connects with a clevis 80 which is attached to a rod 82 of a hydraulic cylinder 84. The opposite end of the cylinder 84 is pivotally connected to a support plate 86 which is an extension of the draw bar support plates 52 and 54. Thus, the plate 86 is fixed to the platform comprising the tool bars and frame members. The cylinder 84 is a double-acting cylinder which requires first and second hydraulic lines 88 and 90.

Also illustrated is a brace 92 which may be attached to the second lever arm extension 78 when the mechanism is not in operation such as during storage or the like. The brace 92 thus serves to lock the platform in a certain fixed position. For this reason, the brace 92 includes a replaceable center section 94 which may be varied according to the storage position one desires to maintain.

The leveling and elevation mechanism operates in the following manner. To lower the platform, the rod 82 is retracted into the cylinder 84. This causes the second lever arm extension to rotate the wheel pivot rod 30 and the attached wheel mounting members 36 and 38 in a clockwise direction. Simultaneously, the first lever arm extension 74 is rotated in a clockwise direction and operates through the linkage arm 76 to pivot the draw bar 48 counterclockwise about the rod 50. Since the platform is being lowered, the counterclockwise pivoting action of the draw bar 48 about the rod 50 effectively maintains the hitch end 66 of the draw bar 48 at a substantially constant elevation. This results even though the platform and all the components attached thereto are being lowered. Reversing the direction of rotation of the pivot rod 30 reverses the rotation of the wheel mounting members 36 and 38 as well as the draw bar 48. Of course, reversing the direction of rotation raises the platform.

By controlling the amount of clockwise rotation of the lever arm, the depth that the chisel plows 26 enter the ground can also be controlled. At the same time, because of the unique arrangement of linkages and lever arms, the chisel plows 26 attached to the forward tool bar 10 will be maintained at the same depth as the chisel plows 26 attached to the rear tool bar 16. In other words, the platform is maintained in a level attitude regardless of the elevation of the platform. Also, if the platform for some reason originally made an angle with the soil surface, that angle would be maintained by the lever arms and linkage of the present invention.

What is claimed is:

1. In a vehicle having a platform, a draw bar attached to said platform, said draw bar having a hitch end for connection with a driving vehicle, and at least one wheel attached to said platform, the improvement of platform elevation and level control means comprising, in combination:

a wheel mounting member for said wheel;
a shaft pivotally connected to said platform for rotation about a first pivot axis substantially perpendicular to the direction of vehicle travel, said wheel mounting member having one end rigidly attached to said shaft to rotate in a plane substantially perpendicular to said shaft, said wheel being rotatably mounted on the opposite end of said member;
a first lever arm connected to said shaft for rotation therewith about said first pivot axis;
a single linkage member connecting said first lever arm to the end opposite said hitch end of said draw bar, said draw bar comprising a substantially straight member which is pivotally connected to said platform at a point intermediate the ends of said draw bar, said connection being intermediate said shaft and said hitch end at a lower elevation than said shaft for rotation about a second pivot axis substantially parallel to said first pivot axis;
a second lever arm attached to said shaft; and
means for driving said second lever arm about said first axis to raise and lower said platform, said first lever arm driving said draw bar to maintain the hitch end at a substantially fixed elevation and simultaneously maintain the platform substantially at a fixed attitude.

2. The improved apparatus of claim 1 wherein means for rotating and maintaining comprise an expansible cylinder connected between said second lever arm and said platform.

3. The improved apparatus of claim 1 wherein said vehicle includes two wheels, each wheel having a separate mounting member.

* * * * *